United States Patent [19]

Hodge

[11] Patent Number: 4,473,273

[45] Date of Patent: Sep. 25, 1984

[54] HIGH BANDWIDTH FIBER AND METHOD OF FORMING THE SAME BY PREFORM ROTATION DURING DRAWING

[75] Inventor: Malcolm H. Hodge, Wyncote, Pa.

[73] Assignee: TRW Inc., Redondo Beach, Calif.

[21] Appl. No.: 304,994

[22] PCT Filed: Sep. 4, 1981

[86] PCT No.: PCT/US81/01184

§ 371 Date: Sep. 4, 1981

§ 102(e) Date: Sep. 4, 1981

[87] PCT Pub. No.: WO83/00856

PCT Pub. Date: Mar. 17, 1983

[51] Int. Cl.³ .............................. G02B 5/172
[52] U.S. Cl. ...................... 350/96.31; 65/3.11
[58] Field of Search .................. 65/2, 3.11, 13; 350/96.29, 96.30, 96.31

[56] References Cited

U.S. PATENT DOCUMENTS

| | | |
|---|---|---|
| 3,666,348 | 5/1972 | Marcatili .................. 65/3.11 X |
| 3,687,514 | 8/1972 | Miller et al. .............. 350/96.15 |
| 3,865,564 | 2/1975 | Jaeger et al. ............. 65/2 |
| 3,909,110 | 9/1975 | Marcuse .................. 350/96.15 |
| 3,912,478 | 10/1975 | Presby .................... 65/2 |
| 3,969,016 | 7/1976 | Kaiser et al. ............. 350/96.15 |
| 4,053,204 | 10/1977 | Miller .................... 350/96.31 |
| 4,053,205 | 10/1977 | Miller .................... 350/96.31 |
| 4,061,484 | 12/1977 | Aulich et al. ............. 65/3.11 X |
| 4,163,601 | 8/1979 | Olshansky ................ 65/3.11 X |
| 4,260,221 | 4/1981 | Marcuse .................. 350/96.31 |
| 4,405,198 | 9/1983 | Taylor .................... 350/96.29 |

FOREIGN PATENT DOCUMENTS 2001050 1/1979 United Kingdom ............ 65/2

OTHER PUBLICATIONS

Nagano et al., Applied Optics, vol. 17, No. 13, Jul. 1, 1978, "Change of the Refractive Index in an Optical Fiber Due to External Forces", pp. 2080-2085.
Marcuse, Multimode Fiber with Z-Dependent $\alpha$--Value, Applied Optics, Jul. 1, 1979, vol. 18, No. 13, pp. 2229-2231.
Jaeger, Laser Drawing of Glass Fiber Optical Waveguides, Ceramic Bulletin, Mar. 1976, vol. 55, No. 3, pp. 270-273.
Barlow et al., Birefringence and Polarization Mode-Dispersion in Spun Single-Mode Fibers, Applied Optics, Sep. 1, 1981, vol. 20, No. 17 pp. 2962-2968.
Weierholt, Modal Dispersion of Optical Fibres with a Composite $\alpha$-Profile Graded-Index Core, Electronics Letters, Nov. 8, 1979, vol. 15, No. 23, pp. 733, 734.

Primary Examiner—John D. Lee
Assistant Examiner—Frank González
Attorney, Agent, or Firm—Newman, Williams, Anderson & Olson

[57] ABSTRACT

The data carrying capacity of an optical fiber drawn from a glass preform is enhanced and optimized by effecting refractive index changes by preform rotation during drawing.

8 Claims, 5 Drawing Figures

HIGH BANDWIDTH FIBER AND METHOD OF FORMING THE SAME BY PREFORM ROTATION DURING DRAWING

BACKGROUND OF THE INVENTION

This invention relates to a high bandwidth optical fiber of high data-carrying capacity and a method for forming the same.

Optical fibers employed for lightwave communication are well-known in the art. The many advantages afforded by the use of light waves for signal transmission purposes over electrical waveforms of energy are also well-known and have led to increasing substitution of optical systems for electrical systems.

As background for the provided invention the following will be noted.

It is well-known that light entering an optical fiber does not propagate randomly as a continuum but rather is channeled into discrete modes having unique wave patterns.

If the optical fiber has an index of refraction which varies radially from a maximum at the core center to a minimum at the cladding interface, in accordance with an exponent $\alpha$ defining a roughly parabolic slope of the gradient, the bandwidth or information carrying capacity thereof is greatly increased. The latter fiber is known as a graded index fiber.

In graded index fibers, incident light rays apparently do not propagate in modes following sharp zig-zag paths but define substantially sinusoidal paths for propagating along the fiber length; oblique rays or modes in such fibers similarly follow helical paths. In any event, graded index fibers serve to minimize the effects of modal dispersion in light waves traversing the fiber. The degree to which dispersion is minimized, with resulting bandwidth enhancement, is dependent upon the index of refraction profile possessed by the specific fiber. In general, graded index fibers have an intrinsic superiority over step index fibers in information carrying capacity, e.g., 200 times the capacity, as the gradient of the index change has a constant effect of refocusing the light, i.e., reducing the dispersion.

Marcuse in his paper "Multimode Fiber with Z-dependent $\alpha$-Value" appearing in Vol. 18, No. 13 of *Applied Optics*, July 1, 1979 discloses the dependence of the rms pulse width response of a graded index multimode fiber on the index of refraction profile of such fiber. Also, this paper discloses an extremely pronounced minimum rms pulse width response at a specific $\alpha$ value. This paper further discloses that the optimum pulse width response is achievable for fibers with nonoptimum $\alpha$ values, if the fiber $\alpha$ varies slowly along the fiber length and deviates on an average by equal amounts to either side of its (constant) optimum value.

Weirholt in Vol. 15, No. 23 of *Electronics Letters*, Nov. 8, 1979, proposes a high bandwidth fiber geometry with a radially varying $\alpha$ profile for achieving an almost flat rms spectral reponse over a spectral region of several hundred nanometers. Formation of such model is suggested by rigorous control the formation of the $\alpha$ profile through appropriate doping procedures. Weirholt suggests an overcompensated or lower $\alpha$ in the central fiber region and an undercompensated or higher $\alpha$ in the peripheral region.

In neither Marcuse nor Weirholt is there suggestion of $\alpha$ optimization by a simple twisting technique during fiber drawdown.

In accordance with the invention herein provided, the data carrying capacity of a graded index fiber is increased by preform rotation in the course of fiber drawing. As a result of such rotation the density of the drawn fiber core is progressively reduced radially of the fiber with an attendant substantially precise lowering in refractive index. Thus, by controlled preform rotation, the index gradient exponent $\alpha$ of a graded index fiber may be altered to approach or attain the optimum $\alpha$, thereby enhancing the refocusing effect of the fiber and hence its bandwidth for greater data carrying capacity. It is believed that the shearing action effected by relative twisting action between the preform and fiber in the plastic neck-down preform region stretches the inter-atom bonds such as silicon-oxygen bonds, which then are frozen in during the rapid fiber cooling phase of drawing, thereby progressively lowering the refractive index radially of the drawn fiber.

As this invention provides fibers with rotation induced lowering of the refractive index, the method disclosed must of necessity lower the $\alpha$ of graded index preforms, and therefore is useful with preforms which have an $\alpha$ higher than the final desired $\alpha$. Thus, preform index of refraction gradients may be lowered to an optimum during fiber drawing by the rotation-induced lowering of the drawn fiber refractive index as will hereinafter be apparent.

The prior art has previously expended considerable effort in endeavoring to effect light mode velocity equalization by causing mode conversion, as in Miller et al. U.S. Pat. No. 3,687,514. As a result, the light energy of the various modes present spend roughly equal amounts of time in different modal configurations and arrive at the fiber end more nearly after the same average time. The Miller et al. patent deals with a step index fiber formed with geometrical irregularities by moving or "jiggling" a preform in the course of fiber drawing for accomplishing the desired mode conversion results. Miller et al. do not describe a change in core refractive index.

Marcatili U.S. Pat. No. 3,666,348 discloses preform control during fiber drawing to reduce unguided mode formation and light loss in a step index fiber.

Kaiser U.S. Pat. No. 3,969,016 discloses mode conversion by heated roller engagement with drawn fibers, relying on fiber axis shifts in the step index fibers processed.

Other patent art dealing with mode conversion in step index fibers comprises Presby U.S. Pat. No. 3,912,478 in which heat is employed for imparting geometrical changes for mode-conversion purposes.

Marcuse U.S. Pat. No. 3,909,110 discloses the building of core index fluctuations into the preform by employing modified doping procedures.

Olshansky U.S. Pat. No. 4,163,601 discloses the formation of perturbations in graded index fibers for mode conversion purposes by employing noncircular draw wheels.

In the foregoing, geometrical changes are imparted to the light waveguides for mode conversion purposes. There is no suggestion of the use of rotation to lower the refractive index of a fiber for purposes of attaining a desired change in the $\alpha$ or index of refraction profile.

OBJECTS OF THE INVENTION

It is an object of this invention, therefore, to provide a high bandwidth optical fiber which is formed by superimposing an index of refraction profile on the profile of the preform so as to obtain a more desired final index.

It is another object of this invention to provide high bandwidths in optical fibers by controlled drawing of the same from a preform.

It is another object of this invention to provide a method of precisely lowering the index of refraction profile of a fiber drawn from a preform so as to approach a desired index by rotating the preform while drawing such fiber therefrom.

It is a further object of this invention to provide optical fibers which are tailored to efficiently conduct light of specific wavelengths.

The above and other objects of this invention will become more apparent from the following detailed discussion when read in the light of the drawing and appended claims.

SUMMARY OF THE INVENTION

In one embodiment of the provided invention a graded index glass preform having an index of refraction profile higher than a desired optimum is heated and rotated during drawing of an optical fiber therefrom. The preform rotation generates a shearing action at the neck down region whereat the formed fiber is drawn from the preform. The shearing action results in a lowering of the glass density which progressively decreases from the fiber center radially outwardly in direct proportion to the increased shearing action occurring during drawing.

A concomitant with the lowering of the glass density is a lowering of the index of refraction. As a result of the simultaneous fiber-drawing and preform rotation, a straight-line, rotation-induced lowering of the index of refraction occurs from the center of the fiber radially outwardly. By controlled preform rotation, a glass fiber may be formed with a desired, substantially precise index of refraction profile whereby the fiber may be tailored for optimum data-carrying capacity as will hereinafter be explained in greater detail.

For a more complete understanding of this invention, reference will now be made to the drawing wherein:

DESCRIPTION OF THE PREFERRED EMBODIMENTS

The aim of this invention is to increase the data carrying capacity of optical fibers by increasing the fiber bandwidth. Such bandwidth increase may be effected in both step index fibers and graded index fibers.

In step index fibers the light modes progress in "steps" comprising reflections within the fiber core with the angles of reflection being equal to or greater than the fiber critical angle. In step index fibers, bandwidth increase is attained by causing the constituent light modes to couple with each other so that their respective velocity-distance products average out. As a result the higher-angle, zig-zag light modes couple with each other so that their respective velocity-distance products average out. The higher angle zig-zag light modes and the lower, more axial modes result in light pulses with reduced dispersion characteristics, thereby allowing more information to be conveyed by such fiber.

Although mode coupling increases the bandwidth in step index fibers, power losses are also increased as certain modes are coupled so as to radiate out of the fiber. Many prior art endeavors seek to effect mode coupling by geometric alteration of the fiber core so as to result in surface perturbations as exemplified by prior art patents above discussed.

Graded index fibers are adapted to minimize modal dispersion while allowing multimode propagation in a fiber core. The index distribution is as the name implies "graded" with a core center of highest refractive index surrounded by cylindrical segments having indicies of refraction which progressively decrease in relation to the radial distance from the center of the fiber. The net result is that the concentric fiber sections function similarly to a series of light-bending lenses. They bend angularly propagated light modes toward the fiber axis. Thus a higher order light mode propagating at an angle relative to the axis of a graded index fiber is continually bent toward the fiber axis by the index profile of lenslike structure as the light mode proceeds along the fiber length. Such higher order mode still travels a greater distance than the central, more axial modes. However, as most of the path of the higher order mode comprises fiber material of lower index material its rate of passage is faster than if propagating on the fiber central zones of higher index.

The degree to which modal dispersion is controlled and bandwidth enhanced in graded index fibers is dependent upon preciseness of formation of the index of refraction profile of the fiber. The slope of this profile or gradient of the index of refraction, defined by the aforenoted exponent $\alpha$, is critical in the obtaining of optimum high bandwidth under normal circumstances.

Figure 1:
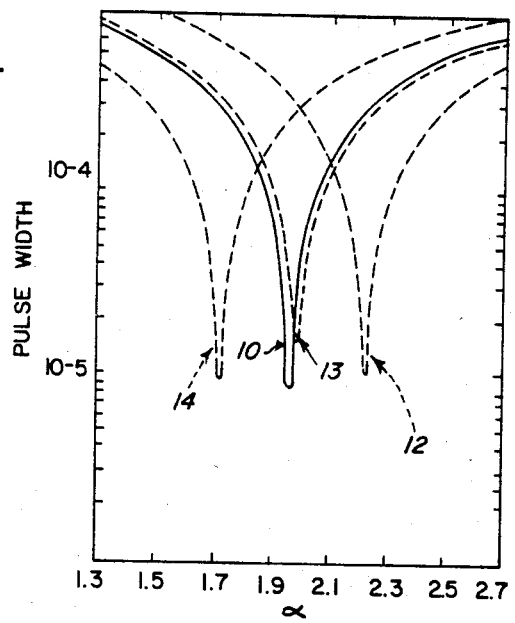
FIG. 1 is a graph from the aforementioned prior article of Marcuse illustrating minimum pulse width response obtainable as a function of a specific index of refraction profile in a graded index fiber.

Referring to FIG. 1 of the drawing, which is reproduced from the aforenoted Marcuse article, solid line curve 10 shows index of refraction gradient value ($\alpha$) plotted versus rms pulse width responses, from which it will be noted that the optimum $\alpha$ or index of refraction gradient for the chosen parameters is 1.967, whereat minimum pulse width response is obtained. If $\alpha$ is changed by 1.3% from the optimum, the pulse width response doubles; a 17% change in $\alpha$ increases the pulse width by 1000%. Thus, pulse spreading and attendant light dispersion and signal attenuation are very sensitive to the index of refraction gradient.

Curves 12, 13 and 14 in FIG. 1 depict the near optimum pulse responses which Marcuse states in his article are obtainable with a multimode fiber having gradually varying alternating values of α which deviate evenly on either side of the optimum value of α as long as the average value of α, averaged along the length of the fiber, is close to the optimum value for a constant α, i.e., the constant value providing the lowest pulse width. Thus, Marcuse has shown in his article that appropriate fluctuations of α to either side of the optimum along the fiber length can result in almost optimum state transmission conditions.

In the present state of the art relating to fiber optics, the limiting factor in long distance light signal transmission is bandwidth as will be noted from the following.

The best fibers now available operate at a 1.3μ wavelength where the fiber attenuation is approximately 1 dB/km and the dynamic range for an adequate signal-to-noise ratio is 55 dB (0 dB m to −55 dB m). On the basis of loss alone, the fiber run between repeaters could be 55 km at 1 dB/km. However, the highest data rate possible over this distance would be 400M.Hz.km/55 km which is a 7.3M Hz bandwidth. This is a very low data rate, far below the 44.3M Hz consistent with the telephone rates currently required. However, the same fiber but with a 7G Hz.km bandwidth gives 127M Hz over the 55 km run, well in excess of the current requirements.

The purpose of this invention is to facilitate attaining desired α profiles bandwidths in optical fibers than now practicable. This is accomplished in the illustrated embodiment by the relatively simple expedient of rotation of the preform during fiber drawing to give a desired α profile along the fiber length.

Glass fiber preforms employed in forming graded index fiber comprise extremely expensive starting boules from which the fibers are drawn. It is difficult and expensive to form such preforms with a precise index of refraction gradient for drawing fibers with a corresponding precise gradient by conventional processes. The present invention comprises a method for altering an imprecise actual gradient of the initial preform and forming therefrom a fiber having substantially the precise gradient needed for optimum light transmission.

The refractive index profile in a standard graded index preform is given by:

$$n_r = n_1 \left[ 1 - 2 \left( \frac{r}{a} \right)^\alpha \Delta \right]^{\frac{1}{2}} \qquad (1)$$

where $\Delta = \left( \frac{n_1^2 - n_2^2}{2n_1^2} \right)$ and $n_1$ = highest core index
$n_2$ = lowest clad index
$a$ = core radius
$r$ = radial distance from core center
$n_r$ = refractive index at r.

Equation 1 may be rewritten as $$n_r = \left[ n_1^2 - \left( \frac{r}{a} \right)^\alpha (n_1^2 - n_2^2) \right]^{\frac{1}{2}} \qquad (1a)$$

by substituting for Δ and rearranging.

Figure 3:
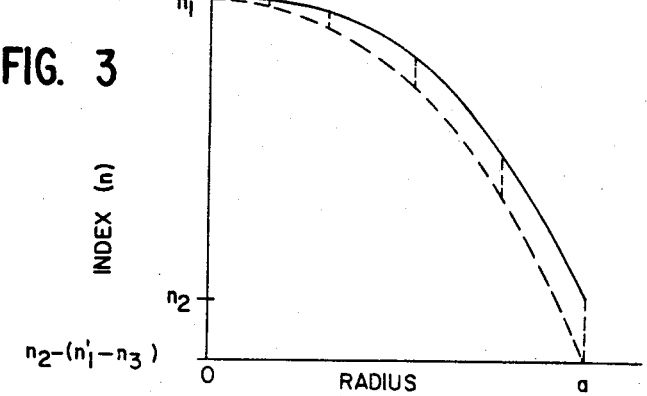
FIG. 3 is a graph schematically illustrating in solid line a typical relationship between the index of refraction and radial distance from the fiber center in a conventional graded index fiber; the radial reduction in index of refraction of FIG. 2 is graphically subtracted from the solid line curve resulting in the dotted line curve illustrative of a modified $\alpha$ resulting in a fiber after the invention of this application has been carried out.

FIG. 3 of the drawing illustrates schematically the refractive index decrease of the equations with increasing radial distance from the fiber central axis in the solid line curve. Thus, as the fiber radial location progresses from the fiber center toward "a," the index of refraction decreases from the maximum $n_1$ at the fiber center to the minimum $n_2$ at the cladding interface.

The foregoing equation states that the progression of change of the index n is a function of α, the gradient exponent. For minimum pulse dispersion α must hold closely to a specific value. One purpose of this invention is to demonstrate that a beneficial modification of a nonoptimized α can be brought about by superimposing a linear index gradient/radius function, the latter gradient resulting from preform rotation and its concomitant shear-induced structure modification, upon the "built in" or actual gradient profile otherwise obtained in formation of the fiber.

The rotational profile or index of refraction modification provided by this invention may be described by the equation:

$$n_r' = n_1' - (n_1' - n_3)(r/a) \qquad (2)$$

where
$n_1'$ = preform starting index of refraction
$n_3$ = greatest reduction in index of refraction
$n_r'$ = refractive index modification at any radius r.

Figure 2:
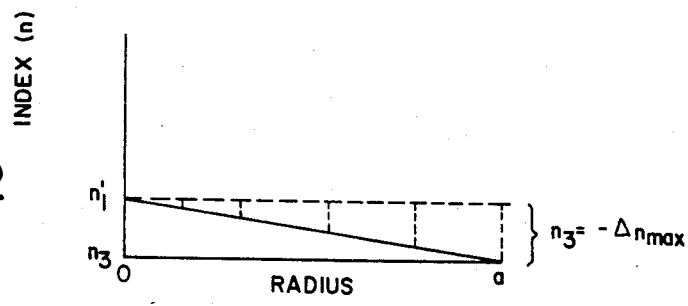
FIG. 2 is a graph showing the straightline relationship between the reduction in index of refraction and radial distance in a fiber subjected to the rotational process employed in drawing a fiber from a preform in accordance with the teachings of this invention.

FIG. 2 of the drawings illustrates such linear function comprising index of refraction reduction increase with fiber radial distance. This reduction is subtracted from the solid line curve in FIG. 3. The resulting dotted line curve defines the index of refraction gradient of a fiber made pursuant to this invention.

The combined effects of the standard and rotational profiles may be expressed by the following equation 3 in which equations 1a and 2 are combined to give:

$$\alpha = \frac{\ln \left\{ \frac{n_1^2 - \left[ n_r + (n_1 - n_3)\left(\frac{r}{a}\right) \right]^2}{n_1^2 - n_2^2} \right\}}{\ln \left( \frac{r}{a} \right)} \qquad (3)$$

The equivalent form of Equation 1a, for comparison is $$\alpha = \frac{\ln \left\{ \frac{n_1^2 - n_r^2}{n_1^2 - n_2^2} \right\}}{\ln \left( \frac{r}{a} \right)} \qquad (1c)$$

to which 3 reduces when $n_3 = n_1$, i.e., no rotational index changes are induced.

The superimposing of a linear function (of FIG. 2) on a roughly parabolic function (solid line curve of FIG. 3) results in a slightly varying, or hybrid, parabolic function (dotted line curve of FIG. 3) whose exponent changes slightly with radius.

Two examples of the effect of rotational gradient upon the standard compositional gradient will demonstrate this point. In these examples, an optimum $\alpha$ of 1.964 will be sought, and the starting extreme refractive indices of $n_1 = 1.465$ of the glass core and $n_2 = 1.450$ for the fiber cladding are assumed, and a drawing speed of 20 meters per minute at typical drawing temperature i.e., about 2050° C. are also assumed as conditions present.

EXAMPLE 1

In Example 1 the data of which is set forth below in Table 1, starting $\alpha$ of formation of 2.000 is assumed in a graded index preform from which a fiber is drawn. It is desired that the fiber drawn therefrom be modified to have a rotation-induced change in $\alpha$ to 1.964 for optimum efficiency in a specific light conveying application.

Table 1 lists typical $n_r$ or index of refraction values in column b and column c for such ideal and starting $\alpha$ values respectively. The index values of these two columns are listed as a function of the core radius ratio (a/r), see column a. Column a indicates the radial location or the percentage of radial distance from the preform or fiber center at which the values of columns b, c, d, e and f are tabulated. Tabulated in column d of the table is the difference between the $n_r$ values, percentagewise, for the two gradients 2.000 and 1.964 at the radial locations of column a.

column f, the speed of rotation and resulting shearing action would be greater in drawing the fiber of column f than in drawing the fiber of column e, if both fibers are drawn from preforms having an original $\alpha$ of 2.000.

In accordance with this invention each of the $\alpha'$ values of columns e and f may be obtained by employing equation 3 above set forth. In each of the tabulated values of columns e and f, the $\alpha'$ is not a single value across the fiber profile inasmuch as the shearing action resulting in reduced index of refraction is most pronounced at the fiber core outer periphery and progressively decreases as the fiber central longitudinal axis is approached. However, it is readily apparent from the tabulated data that even with the slight changes in gradient, the average $\alpha$ would be much closer to the optimum $\alpha$ than the starting value of 2.000. It can be seen from column (e) that a maximum fiber core index depression of 0.00017 (0.012%) results in average $\alpha$ of 1.980, while a depression of 0.00032 (0.022%) would provide an ideal $\alpha$ average of 1.964 as seen in column f. It will be appreciated that the bandwidth optimum need not necessarily coincide with the average optimum. This is so as the radial $\alpha$ drift comprising the superimposed, rotation-induced $\alpha$ depression extends radially from the fiber axis in a nonuniform manner.

TABLE 2

| (a) $\left(\frac{r}{a}\right)$ | (b) $\alpha = 1.964$ (IDEAL) $n_r$ | (c) $\alpha = 2.000$ (STARTING) $n_r$ | (d) $\Delta n_r$ % | (e) $\alpha = 2.000$ $(n_1 - n_3) = 0.0017$ $\alpha'$ | (f) $\alpha = 2.000$ $(n_1 - n_3) = 0.0032$ $\alpha'$ |
|---|---|---|---|---|---|
| 0.1 | 1.464838 | 1.464851 | 0.0009 | 1.959 | 1.929 |
| 0.2 | 1.464366 | 1.464403 | 0.0025 | 1.973 | 1.956 |
| 0.3 | 1.463597 | 1.463656 | 0.0040 | 1.978 | 1.960 |
| 0.4 | 1.462530 | 1.462610 | 0.0055 | 1.981 | 1.966 |
| 0.5 | 1.461169 | 1.461264 | 0.0065 | 1.984 | 1.969 |
| 0.6 | 1.459518 | 1.459618 | 0.0069 | 1.985 | 1.973 |
| 0.7 | 1.457574 | 1.457669 | 0.0065 | 1.986 | 1.975 |
| 0.8 | 1.455349 | 1.455418 | 0.0047 | 1.987 | 1.976 |
| 0.9 | 1.452816 | 1.452862 | 0.0032 | 1.988 | 1.977 |
| 1.0 | 1.450000 | 1.450000 | 0.0000 | | |
| | | | | 1.980 | 1.964 |

EXAMPLE 2

A starting preform $\alpha$ of 2.200 is assumed, with the desired $\alpha$ value of 1.964 being targeted. Table 2 sets out the ideal and starting radial profiles, and the results of different rotational index depressions, as in Table 1.

TABLE 2

| (a) $\left(\frac{r}{a}\right)$ | (b) $\alpha = 1.964$ (IDEAL) $n_r$ | (c) $\alpha = 2.000$ (STARTING) $n_r$ | (d) $\Delta n$ % | (e) $\alpha = 2.200$ $(n_1 - n_3) = 0.0016$ $\alpha'$ | (f) $\alpha = 2.200$ $(n_1 - n_3) = 0.0020$ $\alpha'$ |
|---|---|---|---|---|---|
| 0.1 | 1.464838 | 1.464906 | 0.0046 | 1.813 | 1.766 |
| 0.2 | 1.464367 | 1.464507 | 0.0137 | 1.918 | 1.873 |
| 0.3 | 1.463597 | 1.463944 | 0.0237 | 1.973 | 1.930 |
| 0.4 | 1.462530 | 1.463011 | 0.0329 | 2.006 | 1.967 |
| 0.5 | 1.461169 | 1.461749 | 0.0397 | 2.028 | 1.993 |
| 0.6 | 1.459518 | 1.460141 | 0.0427 | 2.045 | 2.012 |
| 0.7 | 1.457574 | 1.458175 | 0.0412 | 2.057 | 2.027 |
| 0.8 | 1.453400 | 1.458837 | 0.0301 | 2.067 | 2.039 |
| 0.9 | 1.452816 | 1.453116 | 0.0206 | 2.076 | 2.049 |
| 1.0 | 1.450000 | 1.450000 | 0.0000 | | |
| | | | | 1.998 | 1.962 |

Table 1 lists in columns e and f typical refractive index exponent $\alpha'$ values expected from index of refraction decreases occasioned by two different preform rotations in the course of fiber drawing. As the index reduction values of column e are less than those of As in Table 1, two rotational index depression values are used. In Table 2 a maximum index change of 0.0016 (0.110%) is seen to reduce the average $\alpha$ from 2.200 to 1.998, while a refractive index change of 0.0020

(0.138%) achieves an average α of 1.962, quite close to the desired 1.964. Naturally, there is a bandwidth-reduction penalty in the greater range of α values present across the fiber core extending from 2.200 down to 1.964, compared with the less drastic α reduction from 2.200 to 1.998. It is obvious that this penalty is minor when taken in reference to the starting α deviation from optimum present in the original preforms.

The theoretical benefit of improving the α value from 2.2 to the optimum value is one of increasing the bandwidth from, say, 200 $MH_z.km$ to $8GH_z.km$; a 40 fold improvement in data carrying capacity. The improvement gained from the smaller shift of an α starting value of 2.0 is naturally less, being on the order of a four fold improvement from $2GH_z.km$ to $8GH_z.km$.

The slight α variation about the mean induced through rotation limits the gains to some bandwidth below the optimum. Nonetheless, the gains are appreciable and simply achieved.

Other benefits provided by the preform rotational treatment during fiber drawdown is an observed approximately 15% increase in fiber breaking strength due to silicon-oxygen bond elongation and resulting increase in ionicity, and a slight but tangible increase in numerical aperture. In the above two examples, the numerical aperture is increased from 0.209 (half acceptance angle of 12.07°) to 0.211 (12.20°) and 0.223 (12.86°) respectively for the rotational derived α values of 1,964 and 1,962. The larger angles allow more light modes to enter the fiber for signal conveying purposes.

The absolute inability to obtain the desired α value at all radial positions simultaneously suggest the beneficial adoption of α value variation along the fiber length. This is achieved by slightly varying the rotation speed during the drawing procedure in a cyclical fashion, thereby creating an α range of values disposed on either side of the optimum.

The foregoing examples relate to graded index fibers. However, the foregoing technique of forming outer fiber zones of reduced density and index of refraction as the result of a compound shearing action caused by preform rotation during fiber drawing may also be employed for purposes of mode coupling in stepped index fibers.

Periodic rotation of preforms during glass fiber draw down has resulted in step index fibers having reduced mode dispersion. Experimental fibers formed by sporadically rotating a preform at 1000 rpm on cycles of 2 seconds on and 3 seconds off and a drawing rate of 20 meters per minute had markedly lower numerical apertures and a modal distribution pattern devoid of axial modes. Such processed fibers indicate that the guided modes have been restricted to narrow windows in the fiber section which result in reduced mode dispersion and increased bandwidth.

Rotating the preform about an eccentric axis will give rise to exaggerated surface perturbations on the fiber periphery if the same were desired for mode coupling purposes in the drawing of fiber from a step index preform. The high bandwidth graded index fibers of this invention, however, as above noted, neither require nor benefit from surface irregularities.

The provided density reduction resulting from rapid axial rotation of the preform and simultaneous axial reduction in the drawn fiber is thus seen to impress a modified gradient on the "actual" gradient already present in the preform.

The provided method of altering the index of refraction gradient may be employed to impose a desired gradient on fiber drawn from a preform having a gradient which is higher than the gradient desired. As the provided method can only lower the index gradient, preforms may be manufactured with an α value higher than the optimum desired in the fibers to be formed therefrom. Using the method herein provided, preforms of specific profile may have fiber drawn therefrom which is tailored for a specific use and possesses any of a variety of optimum α or index profiles. Thus, fibers may be tailored to provide minimum signal disperson by being designed for the optimum α in accordance with the light wavelengths to pass therethrough, as the longer the wavelength the lower the necessary α for optimum transmission. Thus, whereas an α of 1.967 may be desired for a light wavelength of $0.82\mu$, an α of 1.821 might be desired for a wavelength of $1.32\mu$.

Figure 4:
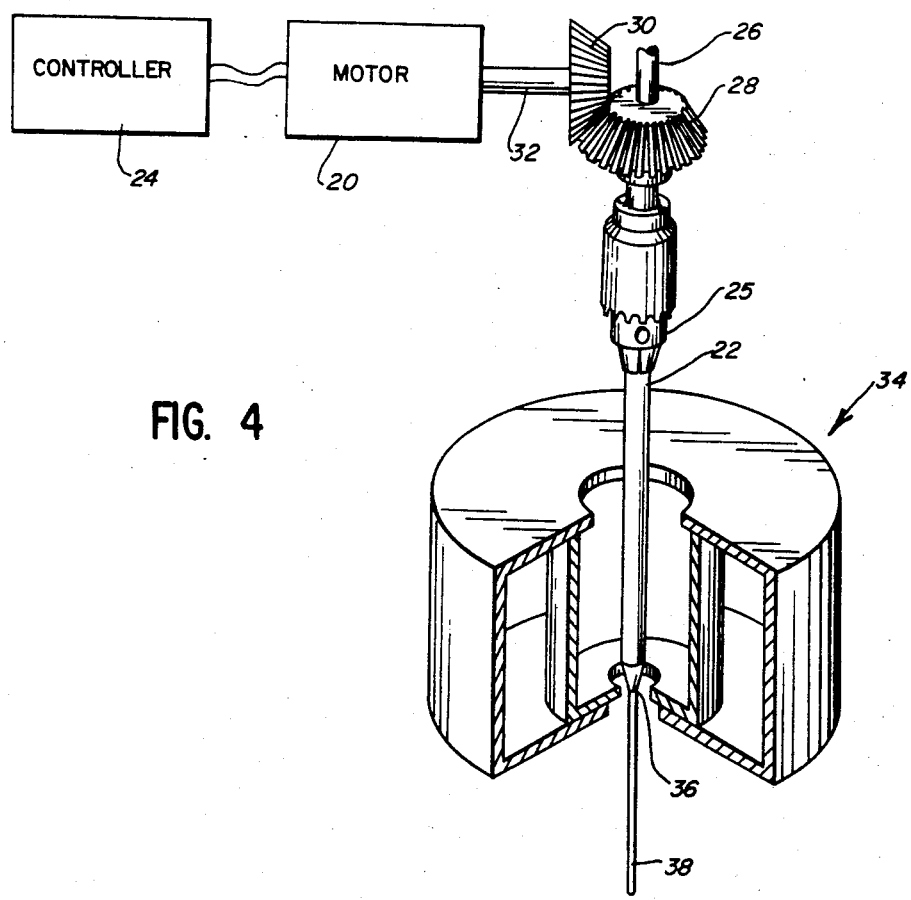
FIG. 4 schematically illustrates apparatus which may be employed for purposes of rotating a preform in the course of fiber draw down when forming fibers made in accordance with this invention.

It will be noted from FIG. 4, that a motor 20 for rotating preform 22 may be precisely controlled by controller 24 to impart a precise speed of rotation to preform 22 during the fiber drawing process. The preform 22 is secured in chuck 25 attached to support rod 26. Rod 26 has a bevel gear or worm section 28 for engaging a mating gear or worm 30 disposed on shaft 32 driven by motor 20. Preform 22 is heated in furnace 34. A neck down region 36 is illustrated in FIG. 4 whereat the twisting, shearing action effected by rotating the preform relative to the axially moving but nonrotating fiber 38 is effected.

Figure 5:
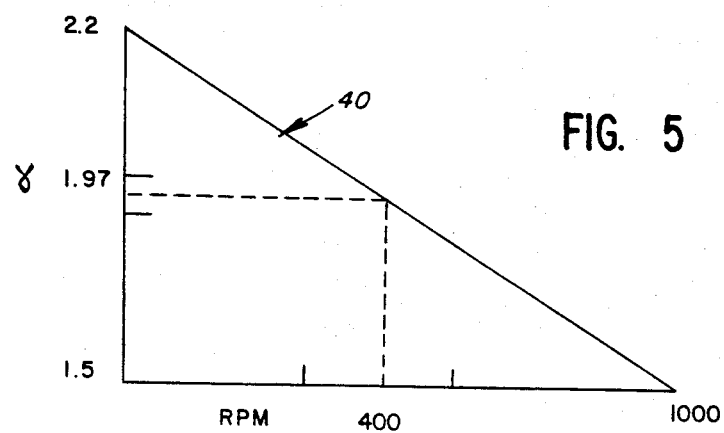
FIG. 5 is a schematic representation of a chart which may be employed in the course of carrying out the method hereinafter disclosed for purposes of forming fibers made in accordance with this invention.

The desired speed of preform rotation may be arrived at after first determining the index profile of preform 22. A chart specific to a particular α such as that illustrated in FIG. 5 is then consulted, the latter chart is specific to a preform having an α of 2.2 and assumes rpm carried out at a typical drawing speed e.g., 20M/min., at typical drawing temperatures, e.g., 2050° C. Fibers drawn from such preform may have their profiles reduced to an α of as low as 1.5 by employing the line 40 depicting the straight-line relationship between α and speed of rotation of the preform. Thus assuming an α of 1.97 is desired for the drawn fiber, the chart of FIG. 5 indicates that the preform is rotated at 400 rpm to provide such reduced α, the chart of FIG. 5 is based on the constant axial draw speed, increased draw speed tending to uniformly reduce the fiber density across the fiber width.

Inasmuch as light of a specific wavelength effects minimum pulse dispersion when propagating through a graded index fiber of a specific α or index profile, the provided invention enables fibers to be formed and tailored to provide minimum loss and optimum efficiency in conveying light of a specific wavelength.

The graded index preform on which a rotational profile is to be superimposed may be continuously rotated as in the manner above discussed in connection with the apparatus of FIG. 4 for effecting the lowering of the elevated α in the preform to a desired constant α in the drawn fiber. As an alternative process, the graded index preform may be intermittently rotated to effect a preform speed of rotation which will effect a lowering of the α in the respective length of the fiber to a value which is less than the desired α to the same degree that the actual preform α of formation exceeds the desired α. As a result, the light modes traversing such fiber will encounter optimum or near optimum average transmission conditions as noted above in the discussion of the curves of FIG. 1. Fibers made from rotating preforms in accordance with this invention may also be formed by utilizing a combination of these alternate methods. The preform speeds of rotation employed to effect desired reduction in the index of refraction and impart desired index gradients in the drawn fibers may be readily ascertained empirically by those skilled in the art.

It is thus seen that a high bandwidth, light-conveying fiber has been provided, as well as a method for forming the same. The method for forming such fibers is both simple and flexible enabling fibers of desired index profiles to be readily formed by a simple step of preform rotation. In an obvious process modification the drawn fiber may be rotated relative to the preform to obtain the desired index reduction, the desired result being the shearing action in the neck down region.

The foregoing has made apparent a number of modifications which may be made in the disclosed invention without departing from the ambit thereof. This invention is to be limited, therefore, only by the scope of the appended claims.

I claim:

1. An optical fiber comprising a glass fiber drawn from a preform having an index of refraction profile; said fiber having a radial refractive index gradient comprising the index of refraction profile of the preform modified by the index of refraction profile imposed thereon by effecting rotational motion between said fiber and the preform from which drawn at intervals along the fiber length in the course of drawing said fiber.

2. An optical fiber drawn from a preform and having radial index of refraction gradients which differ in various portions along the length of the fiber; said gradients defining a desired average gradient; one of said gradients being formed by rotating said preform relative to said fiber in the course of drawing said fiber so as to impose an index of refraction profile linearly decreasing from the fiber center outwardly.

3. The fiber of claim 2 in which said one refractive index gradient is imposed in a gradual manner.

4. In a method for forming an optical fiber from a preform, the steps comprising drawing a fiber from said preform while said preform is heated, and effecting continuous relative twisting motion between said fiber and said preform in the course of drawing first alternate continuous lengths of said fiber and effecting periodic relative twisting motion between said fiber and said preform in the course of drawing second alternate continuous lengths of said fiber.

5. A method for lowering the index of refraction of a preform in the optical fiber drawn therefrom, comprising effecting relative rotation between such fiber and preform in the preform neck down region at intervals along the fiber length during the fiber draw down.

6. The method of claim 5 in which the drawn fiber is a step index fiber and is subjected to rapid cooling following drawing from the preform whereafter such fiber is subjected to surface heat treatment to anneal out the surface effects of rotation, whereafter the surface of the fiber has substantially the same index as the starting preform thereby satisfying those mode mixing and minimizing high order mode loss criteria for high bandwidth step index fibers.

7. The method of claim 5 in which said optical fiber is a multimode fiber.

8. The optical fiber of claim 2 in which said optical fiber is a multimode fiber.

* * * * *